US012200416B2

(12) United States Patent
Weng

(10) Patent No.: US 12,200,416 B2
(45) Date of Patent: Jan. 14, 2025

(54) SPEAKER BUFFER STRUCTURE

(71) Applicant: FORTUNE GRAND TECHNOLOGY INC., Taoyuan (TW)

(72) Inventor: Ming-Chuan Weng, Taoyuan (TW)

(73) Assignee: FORTUNE GRAND TECHNOLOGY INC., Taoyuan (TW)

( * ) Notice: Subject to any disclaimer, the term of this patent is extended or adjusted under 35 U.S.C. 154(b) by 200 days.

(21) Appl. No.: 18/117,487

(22) Filed: Mar. 6, 2023

(65) Prior Publication Data

US 2023/0283937 A1 Sep. 7, 2023

(30) Foreign Application Priority Data

Mar. 7, 2022 (TW) ................................ 111202247

(51) Int. Cl.
*H04R 1/02* (2006.01)
*H04R 1/28* (2006.01)

(52) U.S. Cl.
CPC ............ *H04R 1/025* (2013.01); *H04R 1/288* (2013.01); *H04R 2499/15* (2013.01)

(58) Field of Classification Search
CPC ..... H04R 1/025; H04R 1/288; H04R 2499/15
USPC .......................................................... 381/386
See application file for complete search history.

(56) References Cited

U.S. PATENT DOCUMENTS

2012/0128197 A1* 5/2012 Li ........................ H04R 1/2896 381/395
2015/0117696 A1* 4/2015 Lee ....................... F16F 15/085 267/141
2022/0038800 A1* 2/2022 Prendergast ............. G10H 1/32

FOREIGN PATENT DOCUMENTS

CN 1878269 A * 12/2006 ............. H04R 1/025
CN 109327747 A * 2/2019 ............. H04R 1/025

* cited by examiner

*Primary Examiner* — Sean H Nguyen

(57) ABSTRACT

A speaker buffer structure includes an inner ring, an elastic outer ring, and an elastic bridge. The elastic bridge is connected between the outer peripheral edge of the inner ring and the inner peripheral edge of the elastic outer ring. The outer periphery of the elastic outer ring has a side groove. The side groove is used to connect to a through hole of a retaining tab of a sound box. The elastic bridge absorbs vibration from the speaker to improve the damping effect to limit transmission of vibration to an electronic device containing the speaker.

12 Claims, 6 Drawing Sheets speaker buffer structure of present invention conventional buffer washer speaker buffer structure of present invention

SPEAKER BUFFER STRUCTURE

CROSS-REFERENCE TO RELATED APPLICATION

This non-provisional application claims priority under 35 U.S.C. § 119(a) on Patent Application No(s). 111202247 filed in Taiwan, R.O.C. on Mar. 7, 2022, the entire contents of which are hereby incorporated by reference.

BACKGROUND OF THE INVENTION

1. Field of the Invention

The present invention relates to a speaker buffer structure, and in more particular to a speaker buffer structure that dampens vibration of a speaker from being transmitted to the housing of the electronic device containing the speaker.

2. Description of the Related Art

The majority of consumer electronic devices, for example, mobile phones, flat screens, televisions, notebook computers, etc., need to be equipped with a speaker module in order to produce sound. The speaker module is composed of a speaker unit and a speaker housing, the speaker unit is the main sound unit and the speaker housing is installed behind the speaker to become a speaker module and eventually assembled into consumer electronic devices. When the speaker unit is operating and vibrating the whole speaker module, the vibration is then transmitted to the entire electronic device, especially the top cover of the notebook computer which is usually made up of a large area of ultra-thin hollowed out material and connected to a part of an assembled keyboard. As a result, the strength of the entire upper cover structure is limited. Therefore, when the speaker module operates, the top cover of the laptop will resonate which causes discomfort to the user and it can also cause a considerable degree of resonance abnormal sound which makes people feel uncomfortable. To solve the above problems, between the speaker module and the notebook computer, shock-absorbing pads (usually silicone or sponge material) are installed, that through its material properties and shape, absorb vibrations generated by speaker modules and prevents vibration from being transmitted to the notebook computer.

Refer to FIG. 1, which is a schematic diagram of an assembly of a speaker module installed on the top cover of a notebook computer through a buffer washer of the prior art, and to FIG. 2, which is an exploded view schematic diagram of the speaker module installed on the top cover of the notebook computer through the buffer washer of the prior art. A sound box 10 of the speaker module has a retaining tab 11, and after a buffer washer 20 is embedded in the through hole 12 of the retaining tab 11, the buffer washer 20 is sleeved on the fixed post 31 of the notebook computer top cover 30 and the sound box 10 is fixed to the notebook computer top cover 30 by a screw 32 locked into the fixed post 31. In this way, the buffer washer 20 is used to prevent the sound box 10 directly contacting the notebook computer top cover 30, and by virtue of the buffer washer's 20 silicone material characteristics, absorbs and blocks the kinetic energy of the speaker vibration. Refer to FIG. 3 which is a drawing illustrating the structural appearance of a conventional buffer washer and to FIG. 4 is a drawing illustrating a cross-sectional view of an installed state of a conventional buffer washer. The I-shaped conventional buffer washer 20 in a large impact on the vibration has a limited shockproof effect, especially vibration with a frequency below 200 Hz. Therefore, there is need for an improved speaker buffer structure that effectively prevents speaker vibration from affecting the electronic device containing the speaker module.

BRIEF SUMMARY OF THE INVENTION

In view of the above drawbacks of the prior art, with extensive research and development to overcome these drawbacks, the present invention provides a speaker buffer structure that improves the damping effect and blocks vibration of the speaker from being transmitted to the housing of the electronic device containing the speaker.

In order to achieve the above objectives and more, the technical characteristics of the present invention comprise an inner ring, an elastic outer ring, and an elastic bridge. The elastic bridge is disposed between and connected to the outer peripheral edge of the inner ring and the inner peripheral edge of the outer ring. A side groove is disposed around the speaker buffer structure on a peripheral side edge of the outer ring for connecting to the through hole of the retaining tab of the sound box.

In addition, the elastic bridge is convex arched-shaped, concave arched-shaped, or wave-shaped. The axial projection area of the elastic bridge is greater than the axial projection area of the inner ring. The speaker buffer structure is elastic, and the soft material is, for example, rubber, silicone, or sponge, hot-pressed into one piece. The following specifications are examples, and the present invention is not limited thereto. The speaker buffer structure's material has a hardness ranging from durometer to 60 durometer, or the speaker buffer structure preferably comprises a silicone material with a hardness ranging from 40 durometer to 50 durometer. The ratio of the axial projected area of the elastic bridge to the axial projected area of the inner ring is 1.7:1 to 4.5:1, preferably where the ratio of the axial projected area of the elastic bridge and the axial projected area of the inner ring is from 2.2:1 to 3.8:1. The axial projected area of the elastic bridge accounts for 30% to 55% of the axial projected area of the speaker buffer structure, or preferably wherein the axial projected area of the elastic bridge accounts for 40% to 50% of the axial projection area of the speaker buffer structure. For example, the elastic bridge comprises silicone material, the thickness of the elastic bridge is between 0.3 mm and 0.5 mm, the hardness ranges from 40 durometer to 50 durometer, and the top or bottom surface of the inner ring has a plurality of elastic ridges or elastic bulges.

DETAILED DESCRIPTION OF THE INVENTION

To facilitate understanding of the object, characteristics and effects of the present disclosure, embodiments together with the attached drawings for the detailed description of the present disclosure are provided below.

Figure 5:
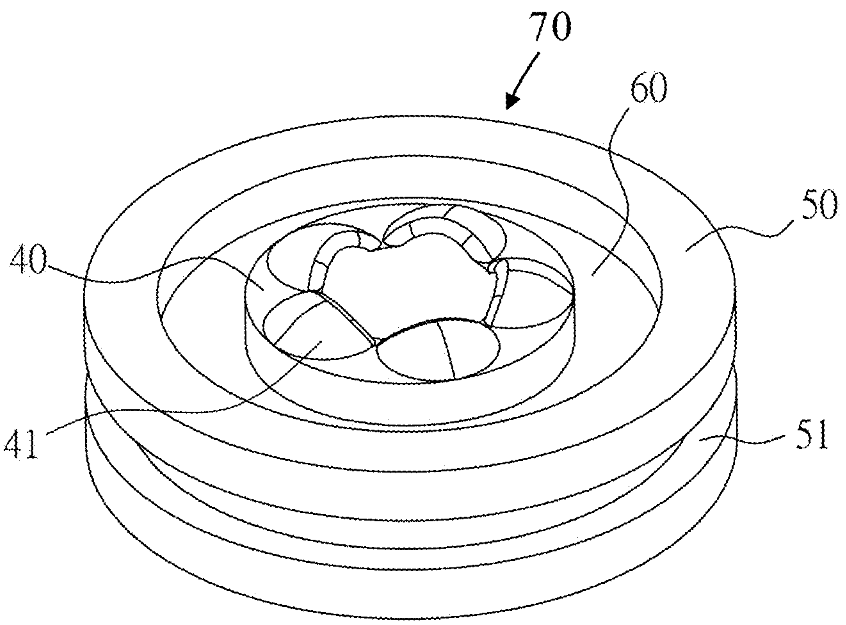
FIG. 5 is a drawing illustrating the structural appearance of a speaker buffer structure according to an embodiment of the present invention.
Figure 6:
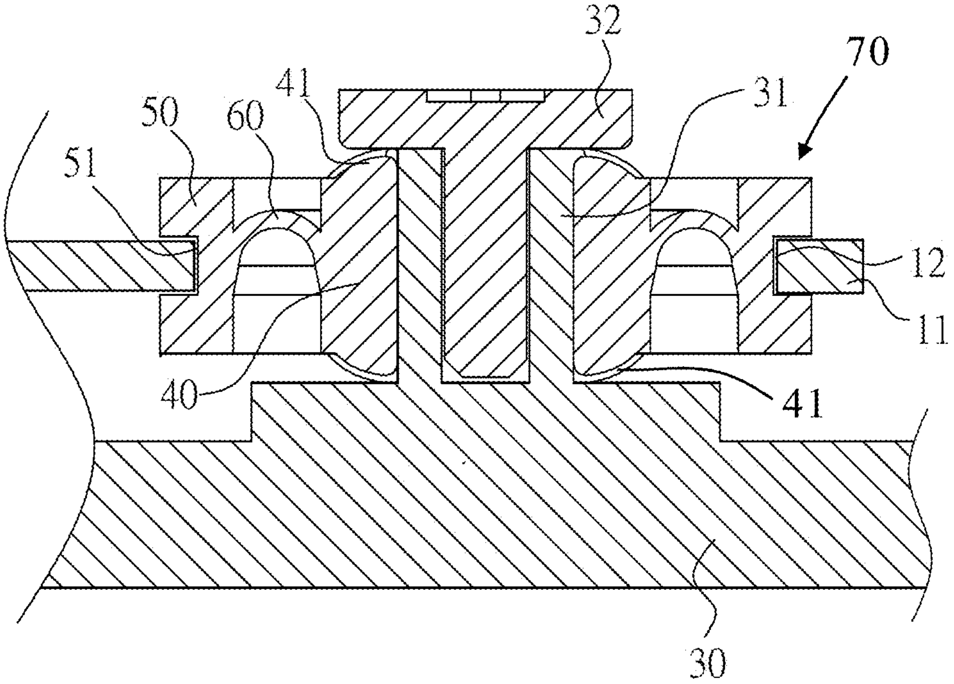
FIG. 6 is a cross-sectional view of the installed state of the speaker buffer structure according to an embodiment of the present invention.

Please refer to FIG. 5, which is a drawing illustrating the structural appearance of a speaker buffer structure according to an embodiment of the present invention and to FIG. 6, which is a cross-sectional view of the installed state of the speaker buffer structure according to an embodiment of the present invention.

The speaker buffer structure 70 of the present invention comprises an inner ring 40, an elastic outer ring 50 and an elastic bridge 60. In some embodiments the inner ring 40 has elasticity. The elastic bridge 60 is disposed between and connected between the outer peripheral edge of the inner ring 40 and the inner peripheral edge of the elastic outer ring 50 in an arched convex shape, an arched concave shape, or a wave shape. The axial projected area of the elastic bridge 60 can be larger than the axial projected area of the inner ring 40, which will help to improve the damping effect, and the speaker buffer structure 70 can be integrally formed by hot pressing of soft materials such as rubber, silicone, silicone rubber, or sponge. For example, the speaker buffer structure 70 is preferably made of silicone material with a hardness ranging from 30 durometer to 60 durometer or, for example, the speaker buffer structure 70 structure is preferably made of silicone material with a hardness ranging from 40 durometer to 50 durometer. The outer peripheral edge of the elastic outer ring 50 has a side groove 51 used to connect to the through hole 12 of the retaining tab 11 of the sound box. In an embodiment, the top surface or the bottom surface of the inner ring 40 has a plurality of elastic bulges or elastic ridges 41.

Based on such a structure, the present invention utilizes the elastic outer ring 50 to shrink inwards to be sleeved in the through hole 12 of the retaining tab 11 of the sound box, and then the elastic outer ring 50 can recover its shape so that the side groove 51 of the outer periphery of elastic outer ring 50 is embedded in the through hole 12 of the retaining tab 11 of the sound box. The inner periphery of the inner ring is sleeved on the fixed post 31 of the top cover 30 of the notebook computer, and finally attached to the fixed post 31 by the screw 32. The screw 32 fixes the sound box to the top cover 30 of the notebook computer. The elastic bridge 60 formed between the outer periphery of the inner ring 40 and the inner periphery of the elastic outer ring 50 can effectively block the vibration of the speaker from passing through to the notebook computer. The elastic outer ring 50 is connected via the elastic bridge 60 to the inner ring 40 around the fixed post 31, so that vibration of the speaker transmitted to the upper cover 30 of the notebook computer is significantly reduced and has the effect of improving the vibration damping effect. Moreover, because the top or bottom surfaces of the inner ring 40 have a plurality of elastic ridges or elastic bulges 41, the bottom surface of the screw head will slightly touch the elastic bulges 41, so that the speaker buffer structure can be firmly fixed, and avoids displacement of the speaker buffer structure 70 under long-term vibration of the speaker situations. It will also ensure that the screw 32 will not excessively squeeze the speaker buffer structure 70 and cause excessive deformation of the speaker buffer structure 70 and affect the damping effect.

As mentioned above, the speaker buffer structure 70 of the present invention is suitable for thin and small consumer electronic products with built-in speaker modules, such as mobile phones, tablets, head-mounted virtual reality devices, televisions, or notebook computers, etc. The speaker buffer structure 70 of the present invention includes an inner ring 40, an elastic bridge 60 and an elastic outer ring 50. The elastic outer ring 50 has a side groove 51 corresponding to the through hole 12 of the retaining tab 11 of the sound box. The inner ring 40 is used to surround the fixed post 31 of the notebook computer, so the volume of the inner ring 40 cannot be too small or thin. The outer ring 50 is used to be combined with the sound box and tightly fitted to the through hole 12 of the retaining tab 11 of the sound box so as to transfer kinetic energy to the elastic bridge 60, so the volume of the elastic outer ring 50 should not be too small or thin. The elastic bridge 60 is the main kinetic energy consuming element, so it can't be too thick or too hard, but it can't be too thin or too soft, otherwise it won't be able to stably support the whole sound box. Generally speaking, the elastic bridge 60 can be an upward or downward roll type. The softer the elastic bridge 60 or the larger the R angle (ie wider), the effect of kinetic energy consumption and the vibration damping effect is better.

The speaker buffer structure 70 of the present invention is mainly used in small speakers built into compact electronic devices such as notebook computers, so the speaker buffer structure should not be too large. The outer diameter of the speaker buffer structure 70 of the present invention should not be greater than 20 mm. For example, the speaker buffer structure 70 of the present invention has the following suitable design dimensions as examples, although not limited thereto. The ratio of the axial projected area of the elastic bridge 60 to the axial projected area of the inner ring 40 is preferably 1.7:1 to 4.5:1; or the ratio of the axial projected area of the elastic bridge 60 and the inner ring 40 is more preferably 2.2:1 to 3.8:1. For example, the axial projection area of the elastic bridge 60 accounts for 30% to 55% of the axial projection area of the speaker buffer structure 70, or the axial projection area of the elastic bridge 60 accounts for 40% to 50% of the axial projection area of the speaker buffer structure. Thereby, the speaker buffer structure 70 of the present invention can have an excellent damping effect. In addition, the elastic bridge 60 can be made of silicone rubber, the thickness of the elastic bridge 60 can be between 0.3 mm and 0.5 mm, and the hardness of the elastic bridge 60 can be between 40 durometer and 50 durometer. Thereby, the speaker buffer structure 70 of the present invention can have a greater damping effect. The axially projected area of the inner ring 40, the axially projected area of the elastic bridge 60, and the axially projected area of the elastic outer ring 50 are respectively obtained by the area of a circle surrounded by its outer diameter minus the area of a circle enclosed by the inner diameter. The axial projected area of the speaker buffer structure is the sum of the axial projected area of the inner ring 40, the axial projected area of the elastic bridge 60, and the axially projected areas of the elastic outer ring 50.

Figure 1:
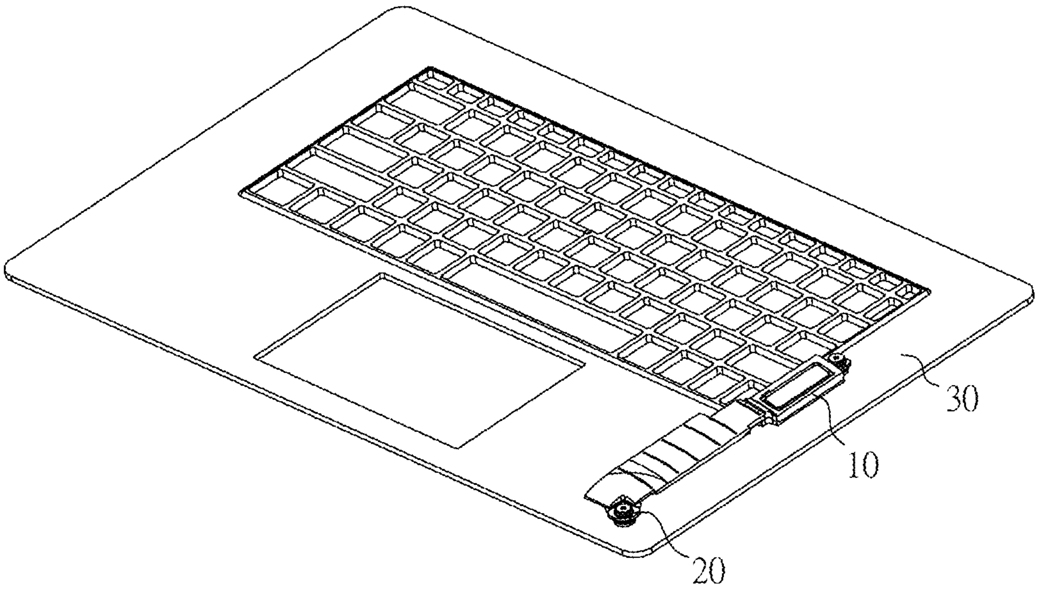
PRIOR ART FIG. 1
FIG. 1 is a schematic diagram of an assembly of a speaker module installed on the top cover of a notebook computer through a buffer washer of the prior art.
Figure 2:
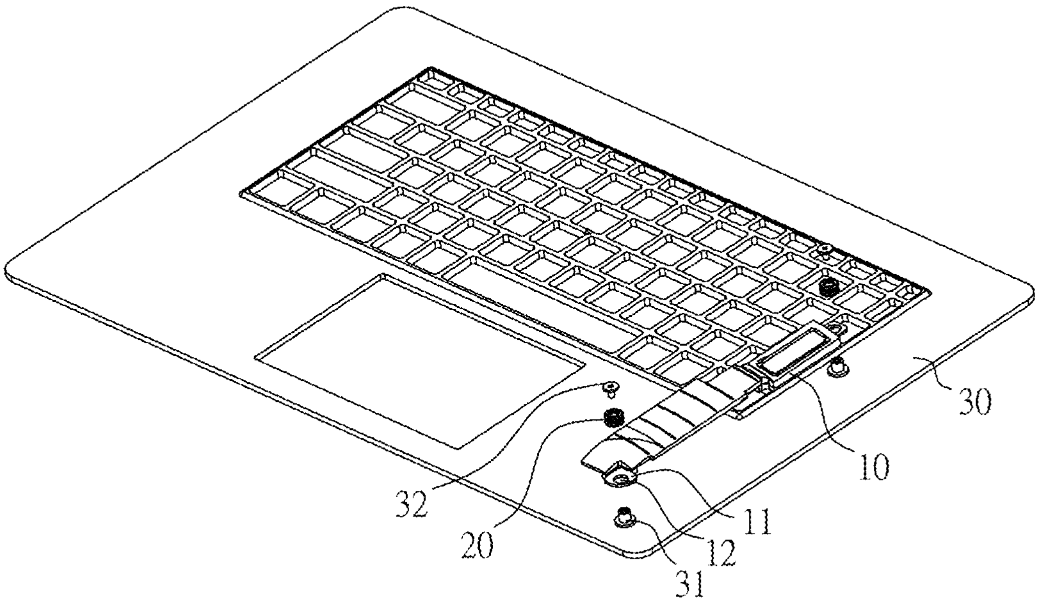
PRIOR ART FIG. 2
FIG. 2 is an exploded view schematic diagram of the speaker module installed on the top cover of the notebook computer through the buffer washer of the prior art.
Figure 3:
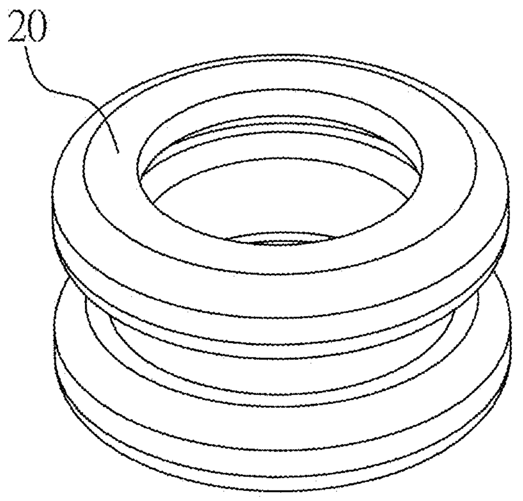
PRIOR ART FIG. 3
FIG. 3 is a drawing illustrating the structural appearance of a conventional buffer washer of the prior art.
Figure 4:
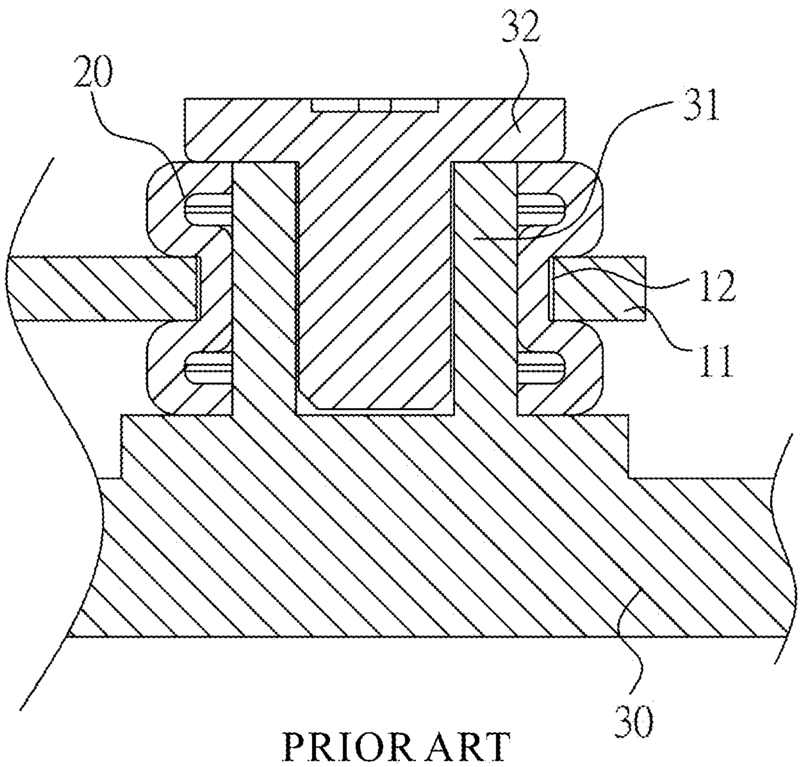
PRIOR ART FIG. 4
FIG. 4 is a cross-sectional view of an installed state of a conventional buffer washer of the prior art.

In summary, please refer again to FIG. 4, when the conventional buffer washer is in use, the through hole 12 of the retaining tab 11 of the sound box is set behind the buffer washer 20, and the sound box will be locked on the fixed post 31 of the notebook computer. Since the buffer washer 20 will be pressed tightly when the screw 32 is fastened, the buffer washer 20 will generate a clamping force on the retaining tab 11, so that the sound box can be fixed on the laptop. Therefore, the conventional buffer washer 20 dissipates the kinetic energy transmitted by the sound box from the vertical direction.

Figure 7:
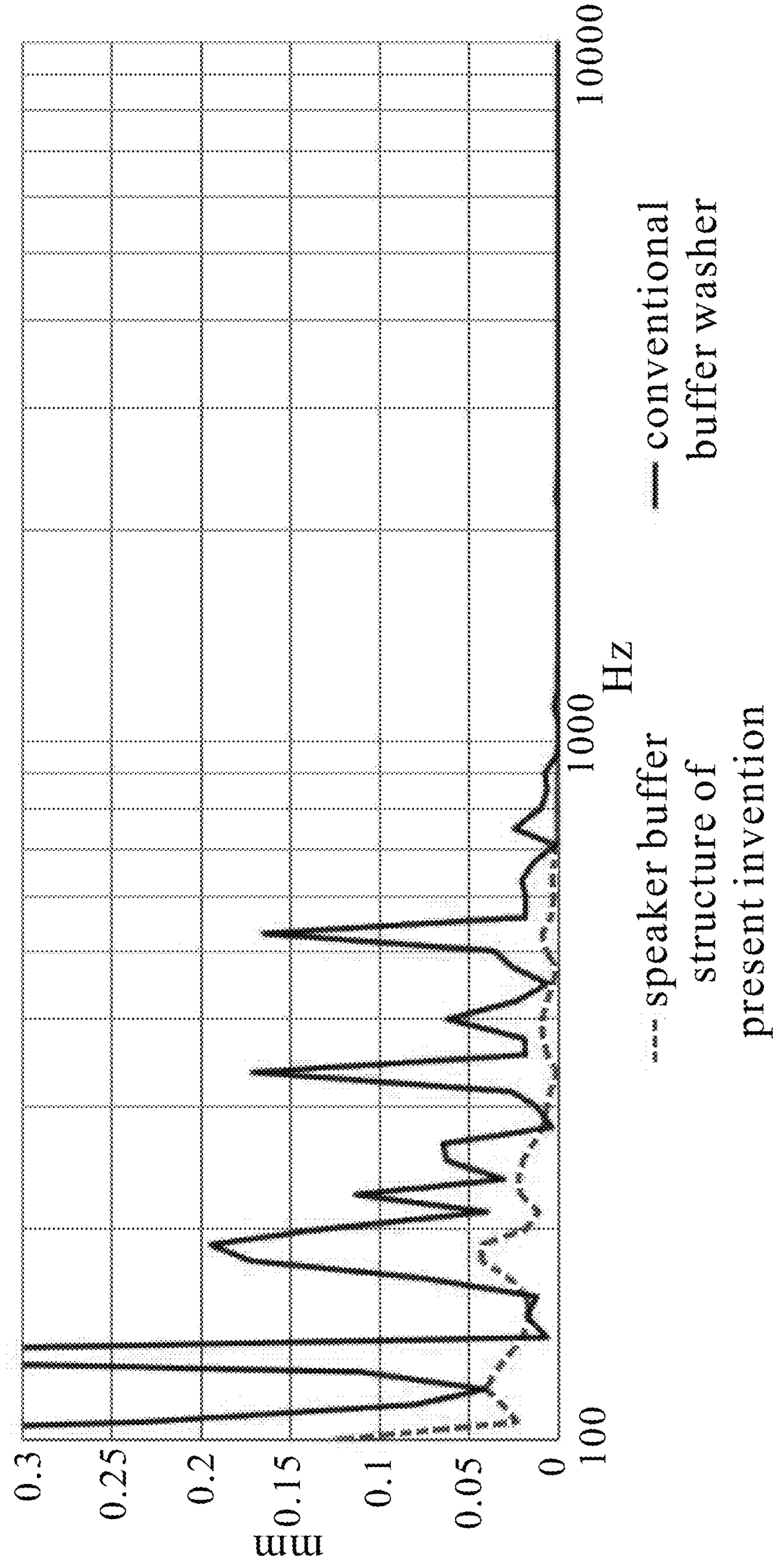
FIG. 7 is a graph illustrating the damping effect of the conventional buffer washer illustrated in FIG. 4 and the speaker buffer structure of the present invention illustrated in FIG. 6.
Figure 8A:
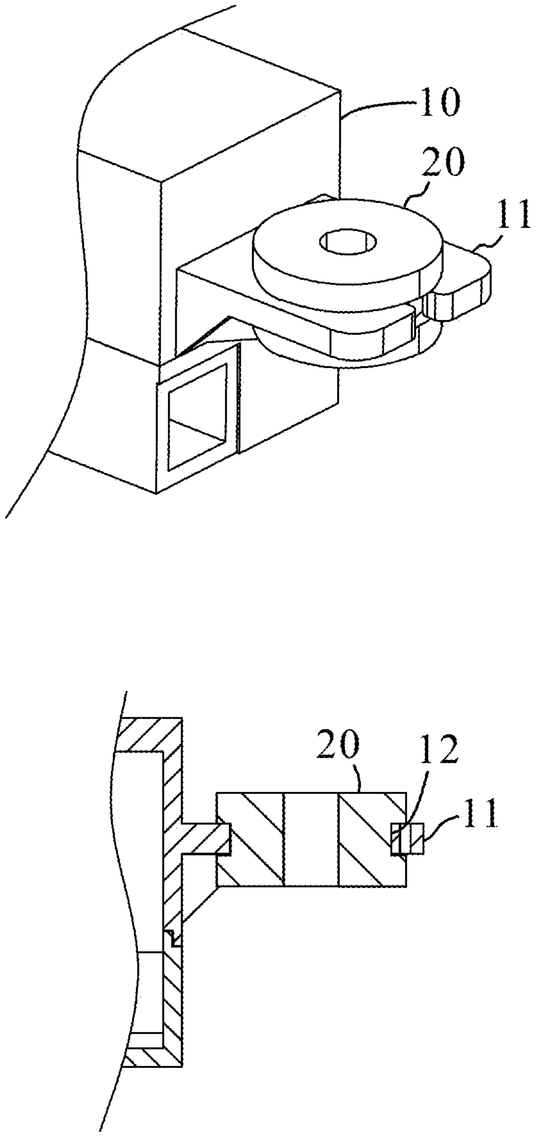
FIG. 8A is a drawing of the conventional buffer washer.
Figure 8B:
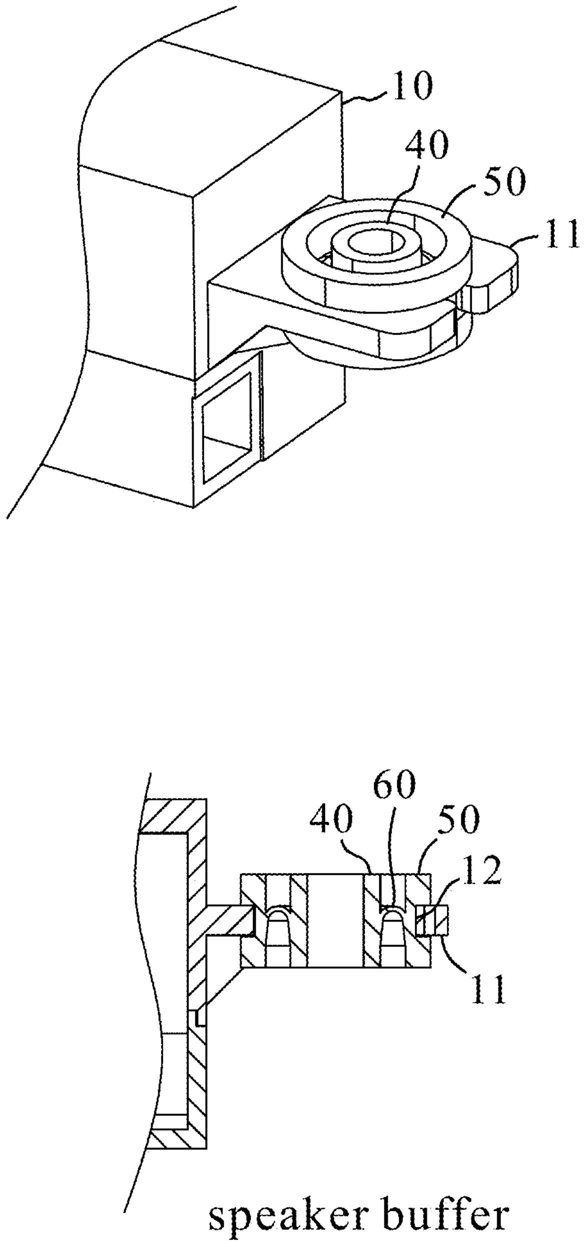
FIG. 8B is a drawing of the speaker buffer structure of the present invention.
Figure 9:
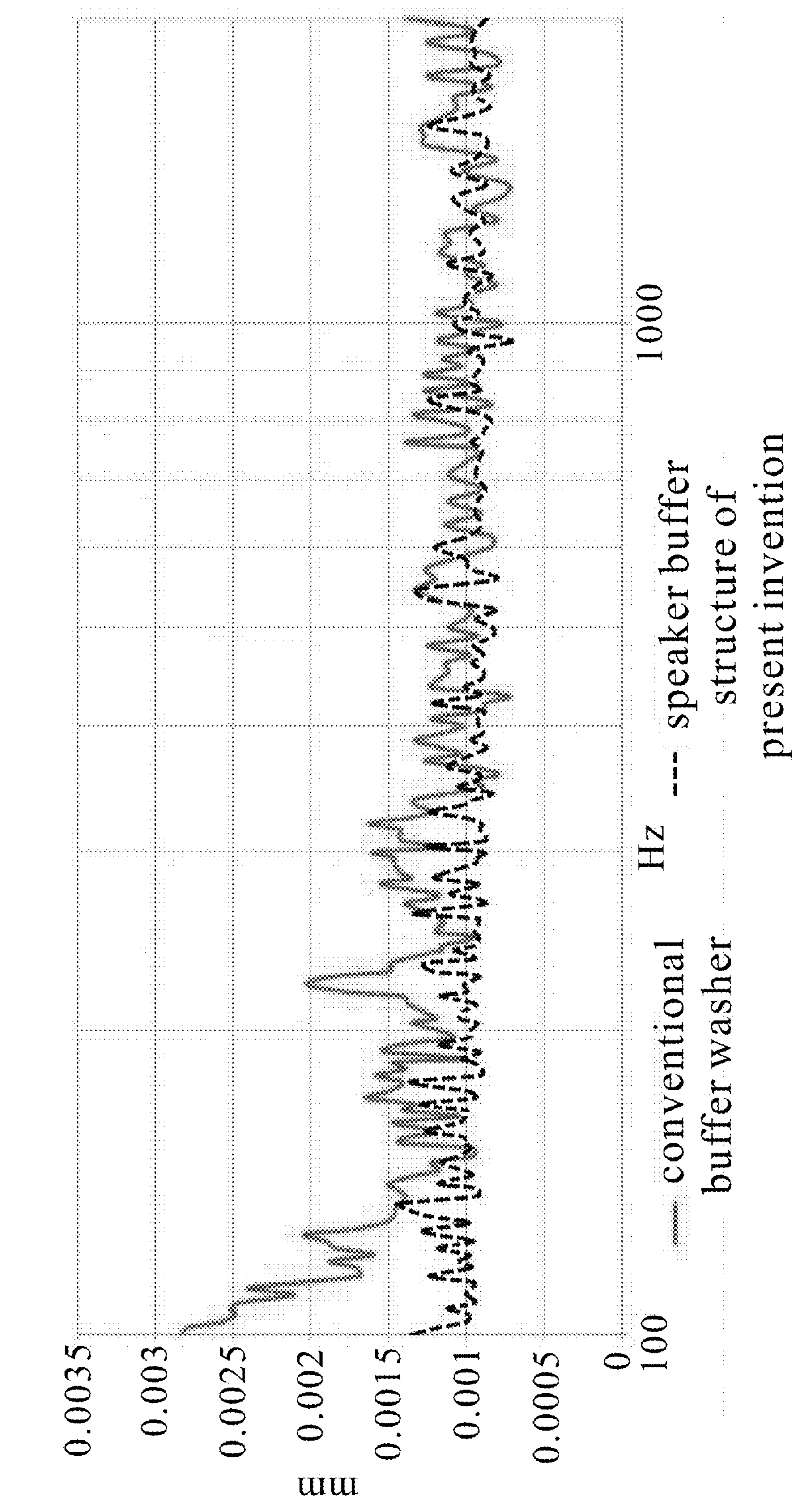
FIG. 9 is a schematic diagram of the damping effect of the conventional buffer washer illustrated in FIG. 8A and the speaker buffer structure of the present invention illustrated in FIG. 8B.

Please refer to FIG. 6, when the speaker buffer structure 70 of the present invention is used, the screw 32 will only tighten the inner ring 40, so the strength of the elastic bridge 60 determines the support of the speaker, so the hardness of the elastic bridge 60 must be moderate. It can't be too hard or too soft. If it's too hard, it won't be able to exert damping. If it's too soft, it won't have enough support. In addition, the elastic outer ring 50 must be combined with the retaining tab 11 of the sound box in a "tight fit" manner, that is, the though hole 12 of the retaining tab 11 is clamped by the side groove 51 of the elastic outer ring 50 in order to transfer kinetic energy to the elastic bridge 60. Therefore, the speaker buffer structure 70 of the present invention consumes the kinetic energy transmitted by the sound box from the horizontal direction. As shown in FIG. 7, the speaker buffer structure 70 of the present invention has a better damping effect than conventional buffer washers. As shown in FIG. 8A, FIG. 8B and FIG. 9, the speaker buffer structure 70 without elastic bulges 41 of the present invention also has a better damping effect compared with conventional buffer washers.

The present invention is disclosed by way of the preferred embodiments above. A person skilled in the art should understand that, these embodiments are merely for illustrating the present invention and are not to be construed as limitations to the scope of the present invention. It should be noted that all equivalent changes, replacements and substitutions made to the embodiments are encompassed within the scope of the present invention. Therefore, the scope of legal protection of the present invention should be defined by the appended claims.

What is claimed is:

1. A speaker buffer structure comprising:

an inner ring;

an elastic outer ring; and an elastic bridge, the elastic bridge is disposed between and connected to an outer periphery of the inner ring and an inner periphery of the elastic outer ring;

wherein an outer peripheral edge of the elastic outer ring has a side groove, and the side groove is used for connecting to a through hole of a retaining tab of a sound box.

2. The speaker buffer structure according to claim 1, wherein the elastic bridge is a convex arch shape, a concave arch shape, or a wave shape.

3. The speaker buffer structure according to claim 1, wherein an axial projected area of the elastic bridge is larger than an axial projected area of the inner ring.

4. The speaker buffer structure according to claim 3, wherein the speaker buffer structure is integrally molded by hot pressing of soft materials such as rubber, silicone, or sponge.

5. The speaker buffer structure according to claim 4, wherein the speaker buffer structure is made of a silicone material with a hardness ranging from 30 durometer to 60 durometer.

6. The speaker buffer structure according to claim 5, wherein the speaker buffer structure is made of the silicone material with the hardness ranging from 40 durometer to 50 durometer.

7. The speaker buffer structure according to claim 3, wherein a ratio of the axial projected area of the elastic bridge to the axial projected area of the inner ring is 1.7:1 to 4.5:1.

8. The speaker buffer structure according to claim 7, wherein the ratio of the axial projected area of the elastic bridge to the axial projected area of the inner ring is 2.2:1 to 3.8:1.

9. The speaker buffer structure according to claim 1, wherein an axial projected area of the elastic bridge accounts for 30% to 55% of the axial projected area of the speaker buffer structure.

10. The speaker buffer structure according to claim 9, wherein the axial projected area of the elastic bridge accounts for 40% to 50% of the axial projected area of the speaker buffer structure.

11. The speaker buffer structure according to claim 1, wherein the elastic bridge is made of silicone material, thickness of the elastic bridge is between 0.3 mm and 0.5 mm, and hardness of the elastic bridge is between 40 durometer and 50 durometer.

12. The speaker buffer structure according to claim 1, wherein a top surface or a bottom surface of the inner ring has a plurality of elastic bulges.

* * * * *